United States Patent [19]
Marston et al.

[11] Patent Number: 5,794,123
[45] Date of Patent: Aug. 11, 1998

[54] FADE RECOVERY IN DIGITAL MESSAGE TRANSMISSION SYSTEMS

[75] Inventors: Paul S. Marston, Cambridge; Brian G. Maloney, Hardwick, both of England

[73] Assignee: U.S. Philips Corporation, New York, N.Y.

[21] Appl. No.: 557,803

[22] Filed: Nov. 20, 1995

[30] Foreign Application Priority Data

Dec. 2, 1994 [GB] United Kingdom .......... 9424438

[51] Int. Cl.$^6$ ..................................... H04B 7/00
[52] U.S. Cl. .................. 455/38.3; 455/501; 455/504; 455/63; 340/825.44; 375/366; 370/350
[58] Field of Search ...................... 455/38.1, 38.2, 455/38.3, 38.5, 343, 50.1, 51.1, 52.1, 52.3, 63, 65, 67.1, 32.1, 33.1, 89, 227, 228, 229, 501, 502, 504, 506; 340/311.1, 825.44, 825.47, 825.48, 825.21, 825.52; 370/311, 335, 342, 350, 40, 465, 466, 479, 503, 914; 375/340, 365, 366; 379/57, 63

[56] References Cited

U.S. PATENT DOCUMENTS

| | | | |
|---|---|---|---|
| 4,768,032 | 8/1988 | Sharpe et al. | 340/825.48 |
| 4,816,820 | 3/1989 | Davis | 340/825.44 |
| 5,283,570 | 2/1994 | DeLuca et al. | 340/825.44 |
| 5,382,949 | 1/1995 | Mock et al. | 455/343 |
| 5,507,040 | 4/1996 | Eaton et al. | 455/343 |

FOREIGN PATENT DOCUMENTS

| | | |
|---|---|---|
| 0118153 | 9/1984 | European Pat. Off. |
| WO9428685 | 12/1994 | WIPO |

OTHER PUBLICATIONS

A copy of the Search Report of PCT/IB95/01001 Dated May 30, 1996.

*Primary Examiner*—Reinhard J. Eisenzopf
*Assistant Examiner*—Doris To
*Attorney, Agent, or Firm*—Jack D. Slobod

[57] ABSTRACT

A method of fade recovery in a digital message transmission system in which data is encoded into code words, formatted into frames of a batch and transmitted in accordance with one or more transmission formats, and a synchronization code word, indicative of the transmission format, is inserted at the beginning of each batch, the method of fade recovery including energizing a receiver for a first predetermined time period and storing any signals received during the first predetermined time period, analyzing the stored signals to determine if the stored signals being transmitted is in one of the transmission formats, and if so, maintaining energization of the receiver in predetermined time increments for up to a maximum of a second predetermined time period and checking if any of the stored signals associated with each such time increment conform to at least one of the transmission formats.

23 Claims, 4 Drawing Sheets

FADE RECOVERY IN DIGITAL MESSAGE TRANSMISSION SYSTEMS

BACKGROUND OF THE INVENTION

The present invention relates to a method of fade recovery in digital message transmission systems such as digital paging. The present invention also relates to a digital message transmission system and to a selective call receiver for use in such a system.

In the present specification the term fade recovery also includes transmission detection. In a fade synchronization with the originally received signal is assumed. However with an extended fade synchronization is assumed to be lost and synchronization has to be regained with a newly received transmission.

EP-B1-0118153 discloses a fade recovery technique for use with POCSAG or CCIR Radiopaging Code No 1. In POCSAG the signal format used comprises a batch structure consisting of a preamble and a succession of concatenated batches. Each batch consists of a synchronization code word plus 8 frames. each comprising 2 code words. making a total of 17 code words. Each code word comprises 32 bits. This known fade recovery technique has a carrier off mode which requires the pager to be energized for the period of one code word in every eighteen code words which is equivalent to one batch plus one code word. Any signal which is received is stored in a shift register having 32 stages corresponding to the length of a code word. After each bit is read-in a check is made to see if the 32 bits stored correspond to preamble or a sync code word. In the event of preamble being detected the pager remains energized to detect the synchronization code word. If and when a synchronization code word is detected the pager resumes the normal selective energization of the receiver. The pager by switching on after an interval corresponding to 18 code words progressively scans through all positions in a batch relative to an arbitrary position such as the batch start position. This fade recovery technique is successful and is applicable to the paging signals having one and the same format and modulation scheme.

In proposed developments of POCSAG, for example such as disclosed in PCT Patent Specification WO94/28685, certain classes of users are activated less frequently than other classes and different bit rates and modulation schemes are used. In order to provide compatibility between different users, transmissions are formatted into cycles, each cycle being of a relatively long duration. If the known fade recovery technique is followed but applied to cycles instead of batches, fade recovery would be an unacceptably long process.

SUMMARY OF THE INVENTION

It is an object of the present invention to expedite fade recovery in a selective call system wherein transmissions are made in cycles of relatively long duration.

According to a first aspect of the present invention there is provided a method of fade recovery in a digital message transmission system in which data is encoded into code words, the encoded data is formatted into frames of a batch, a synchronization code word is inserted at the beginning of each batch, said synchronization code word being selected to be indicative of the transmission format of the code words in the said batch, and in which the batches are transmitted in accordance with the desired transmission format(s), the method of fade recovery comprising energizing a receiver for a first predetermined time period, storing any signals received, analyzing said stored signals in the first predetermined time period to determine if the stored signals have a format which resembles one or more predetermined transmission formats, in response to the stored data having a format which resembles at least one of said transmission formats, maintaining energization of the receiver in predetermined time increments for up to a maximum of a second predetermined time period and checking if the currently stored signal sample conforms to one of said predetermined transmission formats, causing the receiving means to assume its normal battery saving protocol in response to recognizing a synchronization code word and in response to not recognizing a synchronization code word, de-energizing the receiving means and waiting for a third predetermined time period before repeating the sequence of operations.

According to a second aspect of the present invention there is provided a digital message transmission system comprising means for encoding data into code words, means for formatting the code words into frames of a batch, means for inserting a synchronization code word at the beginning of each batch, said synchronization code word being selected to be indicative of the transmission format of the code words in the said batch, means for transmitting the batches in accordance with the desired transmission format (s), and receiving means having a receiver for receiving the transmissions and control means for controlling the operation of the receiving means, the control means including transmission detection means responsive to the loss of received signal, the transmission detection means comprising means for energizing the receiver for a first predetermined time period, means for storing any signals received during a first predetermined period, means for analyzing said stored signals, means responsive to the stored signals having a format which resembles one or more predetermined transmission formats for maintaining energization of the receiver in predetermined time increments up to a maximum of a second predetermined time period, said analyzing means checking the currently stored signal sample to see if it conforms to one of said predetermined transmission formats, means responsive to recognizing a synchronization code word in the currently stored signal sample for causing the receiving means to assume its normal operation and means responsive to the transmission detection means not recognizing known transmitting formats in the analyzed signal for de-energizing the receiver and waiting for a third predetermined time period before repeating the sequence of operations.

The present invention also provides a selective call receiver for use in the system made in accordance with the present invention, a selective call receiver comprising receiving means having a receiver for receiving the transmissions and control means for controlling the operation of the receiving means, the control means including transmission detection means responsive to the loss of received signal, the transmission detection means comprising means for energizing the receiver for a first predetermined time period, means for storing any signals received during the first predetermined period, means for analyzing said stored signals, means responsive to the stored signals having a format which resembles one or more predetermined transmission formats for maintaining energization of the receiver in predetermined time increments up to a maximum of a second predetermined time period, said analyzing means checking the currently stored signal sample to see if it conforms to one of said predetermined transmission formats, means responsive to recognizing a synchronization code word in the currently stored signal sample for causing the receiving means to assume its normal operation and means responsive to the transmission detection means not recognizing known transmitting formats in the analyzed signal for de-energizing the receiver and waiting for a third predetermined time period before repeating the sequence of operations.

By extending the energization of the receiver in the receiving means once a signal having a recognizable format has been detected it is possible to achieve synchronization quicker than would be the case of waiting a cycle period, that is a period corresponding to the duration of a predetermined number of concatenated batches, before re-energizing the recovery means.

The transmission detection means may comprise storage means for storing any signals which are received during the first predetermined time period, signal analyzing means comprising a plurality of parallel operating paths, each path comprising signal recognition means for recognizing a respective one of a plurality of predetermined transmission formats, and means for inhibiting those of said operating paths in which there is no correspondence between the stored signals and the respective predetermined transmission format and for providing an output for that operating path or paths in which there is a recognizable correspondence with one or more of the predetermined transmission formats, said output causing said receiving means to remain energized for the second predetermined period. Analyzing the stored signal in parallel is considered to be more efficient from a current economy point of view than analyzing the signal sequentially.

BRIEF DESCRIPTION OF THE DRAWINGS

The present invention will now be described, by way of example, with reference to the accompanying drawings, wherein.

In the drawings the same reference numerals have been used to illustrate corresponding features.

DETAILED DESCRIPTION OF THE PREFERRED EMBODIMENTS

Figure 1:
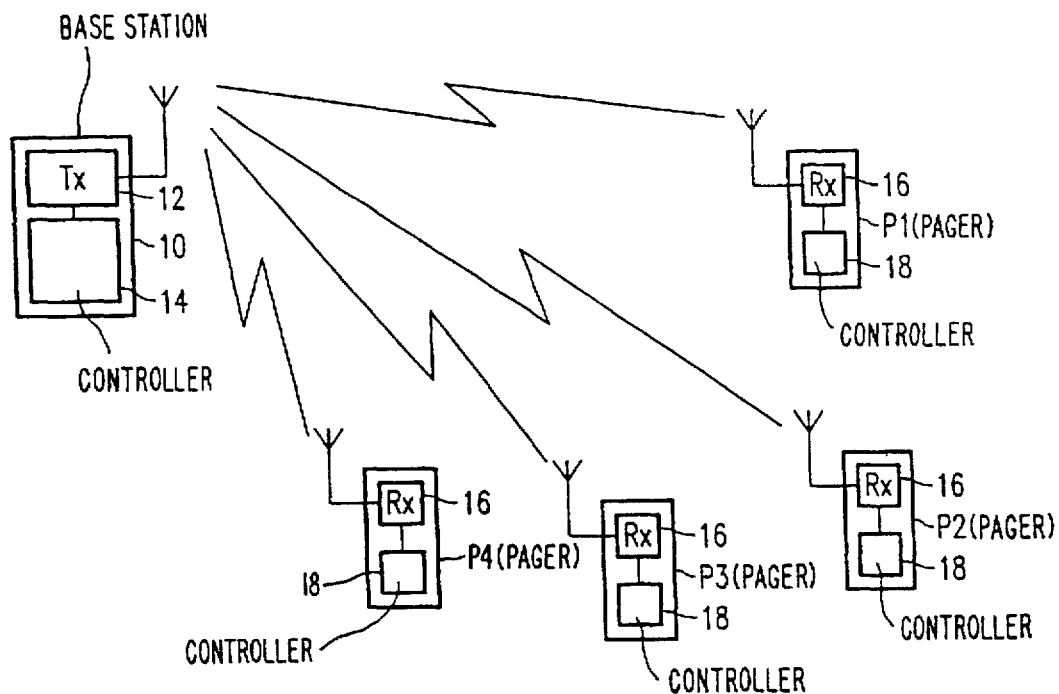
FIG. 1 is a diagram illustrating a selective call system.

The selective call system shown in FIG. 1 comprises a base station 10 which is equipped with a transmitter 12 and a controller 14 which includes means for encoding and formatting signals to be transmitted, the signals may comprise pager radio identity codes (RICs) and, optionally, message data. The bit rate, mode of modulation, frame structure and code word structure of a message are selected to suit the particular application.

A plurality of selective call receivers (or pagers) P1 to P4 are provided. The pagers are able to roam in and out of the coverage area of the transmitter 12. Each pager P1 to P4 includes a receiving section 16 tuned to the frequency of the transmitter 12 and a control section 18 which includes a decoder and processing means for controlling the energization of the receiving section and the energization of one or more alerting devices, for example an acoustic, visual and/or tactile transducer, in the event of the control section identifying the pager receiver's receiver identity code (RIC) in a transmitted message.

Figure 2:
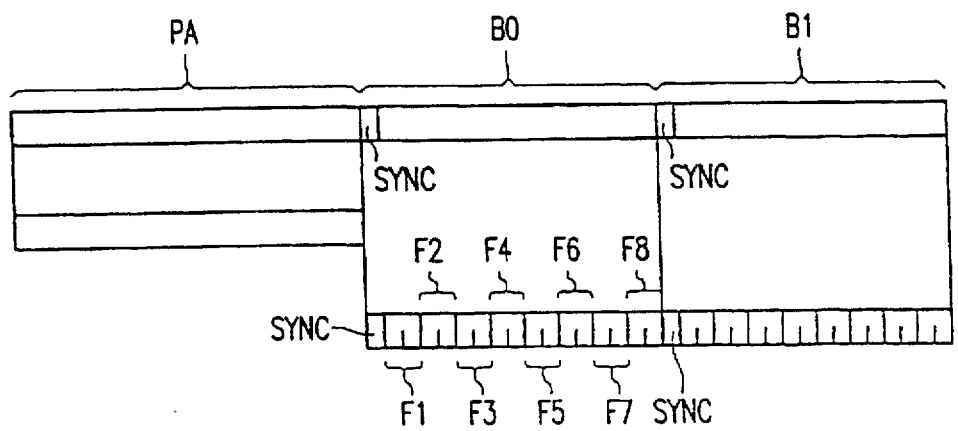
FIG. 2 is a diagram of the POCSAG signal format.

The signal format of the POCSAG or CCIR Radiopaging Code No 1 will, for the sake of comparison, be described with reference to FIG. 2. The normal asynchronous POCSAG transmissions from the base station 10 comprise a series of bursts, each burst comprising a preamble PA of 576 bits which serve to enable the pagers P1 to P4 to achieve bit synchronization, followed by concatenated batches of code words including receiver radio identity codes (RICs) and data messages. In the interests of brevity, the transmission of data messages will not be described in detail. However, the transmission will be assumed to be at 1200 b/s and comprise 2 level, FSK signals. Each batch B0,B1 is arranged identically and comprises seventeen 32-bit code words. At 1200 b/s each batch has a duration of 0.4533 seconds. The first code word is a synchronization code word SYNC which is used by a pager to achieve/maintain word synchronization. The remaining sixteen code words are paired and each of the eight pairs is termed a frame, F1 to F8. Each pager is assigned to a particular frame which means that if it is being paged its RIC will be transmitted in that frame, say frame F4, and no other. Thus, as part of the inherent battery power conservation feature of POCSAG, the pager must energize its receiving section 16 firstly to be able to receive the synchronization code word and secondly for the duration of its frame, in this example F4, but for the duration of the other frames, that is F1 to F3 and F5 to F8, the receiving section 16 can be de-energized. In the event of a fade, synchronization is lost and has to be recovered in order that the pager can operate as desired. A method of implementing fade recovery or more particularly transmission detection for POCSAG is disclosed in European Patent Specification EP-B1-0 118 153 which is reviewed briefly in the preamble of the present specification.

As mentioned in the preamble PCT Patent Specification WO94/28685 discloses high rate paging protocol, that is greater than 1200 bits/second, numeric only and alphanumeric message service which may use the same radio channel as a POCSAG service and be transparent to users of normal POCSAG pagers or be a service which is independent of POCSAG. The high rate paging protocol is a synchronous protocol unlike standard POCSAG.

This high rate paging protocol has enhancements in which batch, frame and code word structures are different as well as having different (higher) bit rates and/or modulation schemes. However, the structure and bit rate of the synchronization code word are maintained substantially the same as in normal POCSAG. The duration of an enhanced batch, referred to hereinafter as a high rate batch HRB, is made a multiple of a standard POCSAG batch duration so that periodically, determined by the lowest common multiple of the batch durations, all the currently operating pagers, that is POCSAG and high rate pagers, are simultaneously energized to receive the next synchronization code word. The synchronization code words themselves will for the enhanced paging services either contain coded data which is decoded by a pager and used to condition the pager so it is capable of receiving the data message subsequently transmitted or be of a type which on being recognized by a pager which has been pre-programmed with these synchronization code words and the associated data, causes the pager to condition itself.

Figure 3A:
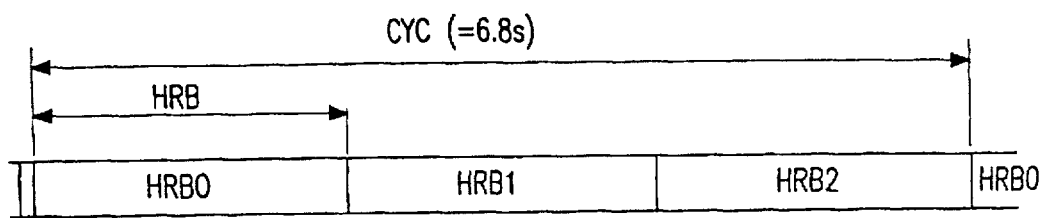
FIGS. 3A and 3B illustrate a generalized format of the message structure of a high rate paging protocol.

FIG. 3A shows an example of a generalized batch structure for the enhanced high rate paging protocol which is a synchronised protocol and comprises one or more concatenated cycles CYC each having a duration of 6.8 seconds. An important rule of this protocol is that the start of any cycle CYC is always an integer number of 6.8 seconds from the start of the previous cycle even if the transmitter has been switched off.

Each cycle CYC comprises 3 high rate batches HRB0, HRB1 and HRB2, each of 2.266 seconds duration. The start of a transmission following a transmitter off period begins with a 32 bit 1200 b/s preamble PA.

Figure 3B:
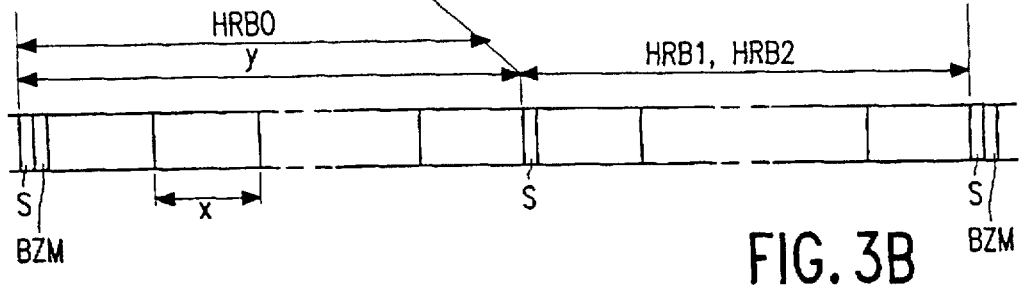

FIG. 3B illustrates in a generalized form the structure of a cycle CYC. The first high rate batch HRB0 of a cycle begins with a synchronization code word S which is followed by a Batch Zero Marker BZM. The BZM is a standard address code word conforming to the code word structure of the other code words in the high rate batch and is transmitted in the first code word position of the first frame of every cycle and is used for cycle synchronization. The BZM may be bit interleaved with other code words in the frame. Each of the other high rate batches, HRB1,HRB2 in a cycle begins with a synchronization code word S. There are 28 frames in a high rate batch and the number, m, of code words to a frame depends on the bit rate. Different types of data may be sent in successive high rate batches. The following table illustrates one scheme in which optionally different bit rates and modulation levels can be used

| Bit Rate (bits per second) | Modulation Levels | No. of frames to a 2.226 second batch | No. of code words to a frame m |
|---|---|---|---|
| 2400 | 2 | 28 | 6 |
| 3200 | 2 | 28 | 8 |
| 4800 | 4 | 28 | 12 |
| 6400 | 4 | 28 | 16 |

In the event of a pager losing contact with the base station transmissions due to say a fade, it will by means of its internal timers maintain cycle synchronization within the limits of the stability of the timers. When the limits of timer stability have been exceeded, during an extended fade, the pager must detect the presence of any transmitted data which would indicate that synchronization could then be regained. In order to achieve this the pager has to determine the current frame structure of the high rate batch, the bit rate, the number of modulation levels and if bit interleaving is being applied.

Figure 4:
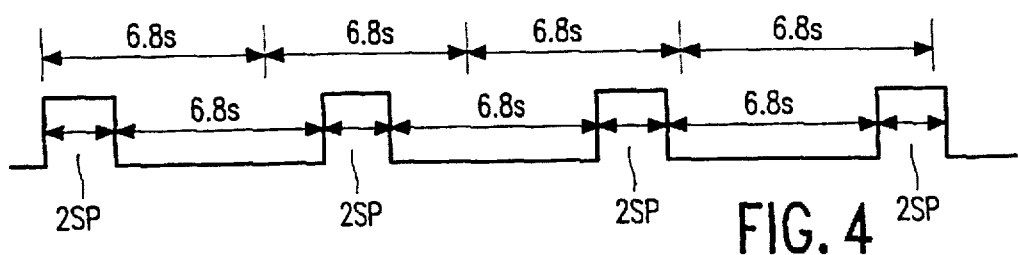
FIG. 4 illustrates the energization of the radio receiving stage for two sample periods when operating in a fade recovery mode.
Figure 5A:
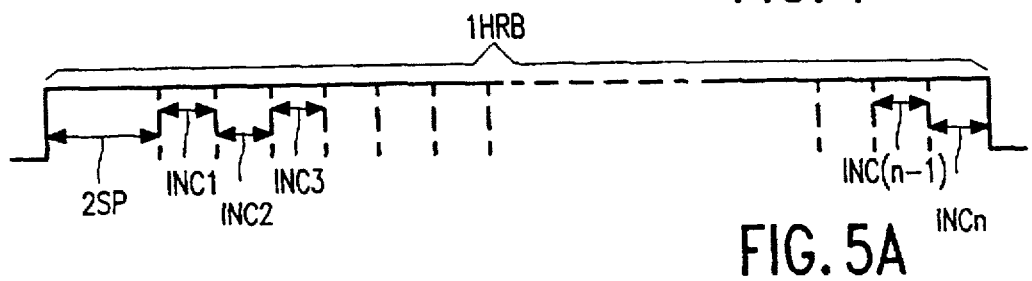
FIG. 5A illustrates the extended energization of the receiver in increments of 1 sample period up to the maximum of one high rate batch period.
Figure 5B:
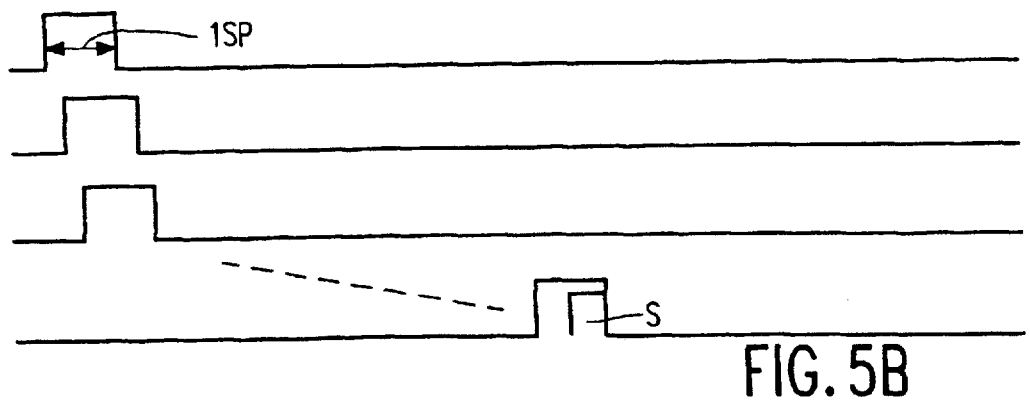
FIG. 5B illustrates analyzing the received signal in samples equivalent to 2 sample periods.

Referring to FIG. 4, a pager on detecting that it has lost synchronization due to, say, an extended fade, adopts a fade recovery or transmission detection mode in which the receiver is energized initially for the duration of two sample periods SP, a sample period being defined as the longest duration of an interleaved block of data at any bit rate or number of modulation levels. Any signals received are stored in a shift register and are analyzed to determine if they are of a recognizable format or formats used by the paging system. If nothing recognizable is found, the receiver is deenergized and waits for the period of a cycle, that is 6.8 seconds in this example, and is energized again for a period equal to two sample periods SP. If the signals stored in the shift register are deemed to be good enough to be recognizable, the energization of the receiver is extended in increments INC1,INC2 . . . INCn as shown in FIG. 5A, each increment corresponding to the duration of one sample period, up to the maximum of a high rate batch period (1HRB). During each increment the signal portions received are analyzed sample by sample using a sliding window one sample period wide to not only arrive at a firm decision on the format being received but also to detect the presence of a synchronization code word. If the synchronization code word S is detected, see FIG. 5B, then the pager achieves high rate batch synchronization and subsequently on detecting the BZM the pager achieves cycle synchronization.

Figure 6:
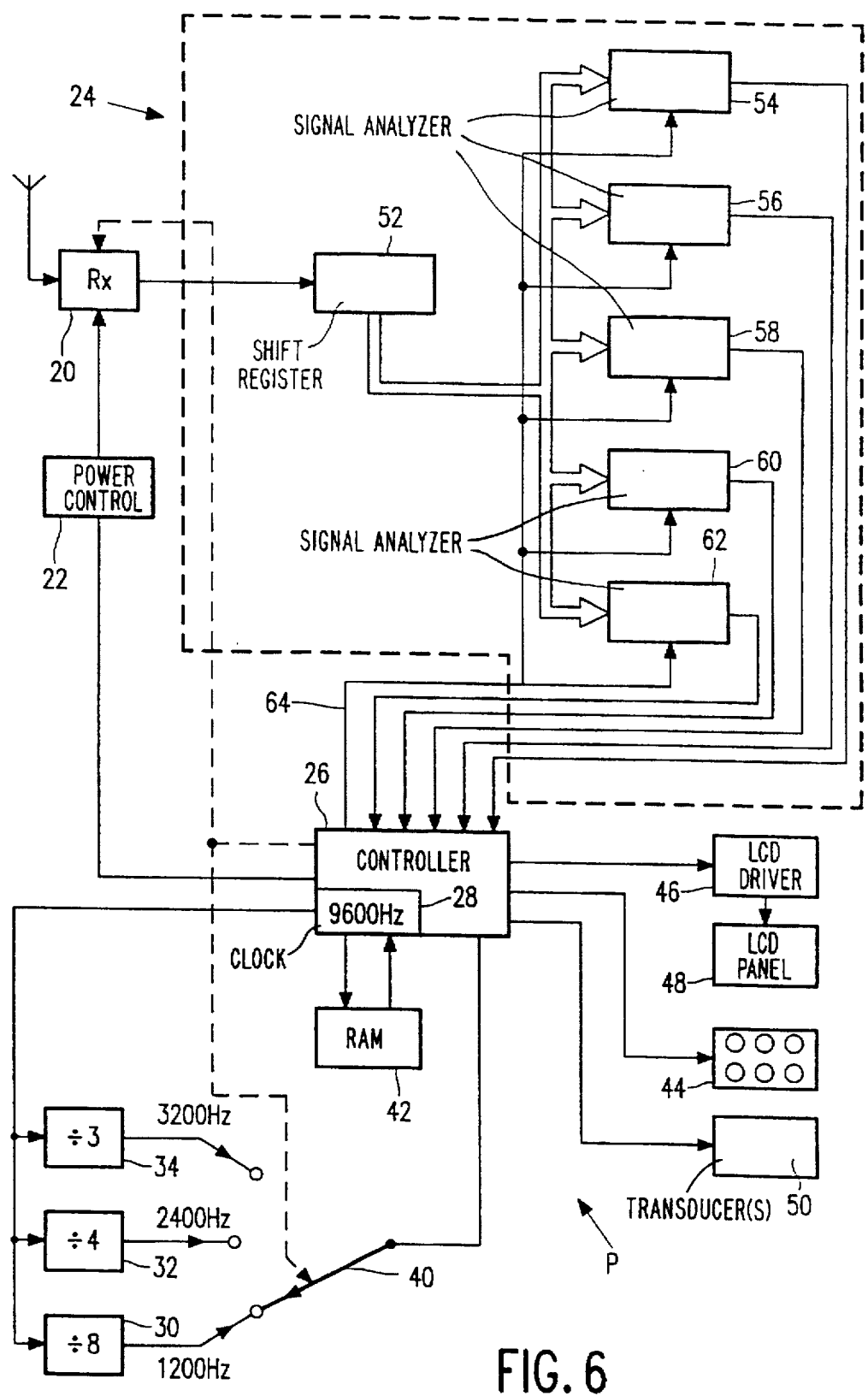
FIG. 6 is a block schematic diagram of an embodiment of a receiver in which signal analysis is done in parallel.

FIG. 6 illustrates an embodiment of a selective call receiver, for example pager, in which the fade recovery or transmitter detection algorithm is implemented.

The selective call receiver or pager P which comprises a receiving stage 20 which is periodically energized by power control stage 22 to be able to receive a 1200 bits per second synchronization code word at the beginning of each batch. The synchronization code word is decoded in a decoding stage 24 and is passed to a controller 26 in which it is used to synchronize the pager's clock 28. If the synchronization code word is not a standard POCSAG synchronization code word, the special information contained within it is recovered and is used by the controller 26 to select the number of modulation levels in the receiver, the bit rate used in the following message and other items of information summarised in the foregoing table. Alternatively, the controller 26 is preprogrammed with details of different synchronization code words and when any one particular synchronization code word is received the controller 26 conditions the pager using pre-stored information relating to that particular code word. In order to be able to detect synchronously the bits in a message which may have a symbol rate of 2400 symbols/second (s/s) or 3200 s/s, the clock 28 has a frequency of 9600 Hz which is supplied to a series of dividers 30, 32 and 34 which respectively divide the clock signal by 8, 4 and 3 to produce clock frequencies of 1200 Hz, 2400 Hz, and 3200 Hz. A switch 40 selects one of these frequencies under the control of the controller 26 and the frequency is supplied as required to the relevant parts of the pager. The pager P further comprises a RAM 42 for storing decoded numeric and alpha-numeric messages. By actuating an appropriate key or keys on a key pad 44, messages are read out from the RAM 42 and supplied to a LCD driver 46 for displaying on a LCD panel 48. One or more alerting transducers are collectively shown by the box 50. The transducers may provide audio, visual and/or tactile alerts.

At the beginning of a new transmission a 32 bit 1200 b/s preamble PA (FIG. 3A) is sent and normally under non-fading conditions, when preamble is detected the controller 26 causes the switch 40 to be connected to the output of the divider 30. The receiving stage 20 remains energized by the power control stage 22 in order to be able to detect the synchronization code word. This code word is examined by the controller 26 to determine if it is a standard POCSAG synchronization code word or one identifying one of the enhanced formats, for example as shown in the above table. Assuming that it is one of the latter synchronization code words, then the controller 26 conditions the pager by for example actuating the switch 40 so that it selects the output of the divider 32 or 34 so that it can receive the address, including BZM, and message code words contained in the following high rate batch. If the received RIC corresponds to one assigned to the pager P, it remains energized to process the subsequent message. Optionally, the user may be alerted by the controller 26 causing the alerting transducer(s) 50 to be energized. At the commencement of each new high rate batch, the synchronization code word is checked and the pager P is conditioned as necessary in order to be able to receive and process the next high rate batch which may be of a different interleaving format, bit rate and modulation type to the immediately preceding high rate batch. A decoded message is stored in the RAM 42 and when convenient to the user the message is read-out and displayed on the LCD panel 48.

However, in the event of a fade, the pager implements fade recovery or transmission detection in the manner described above. In order to be able to effect fade recovery the decoding stage comprises a shift register 52 for storing a data sample equivalent to one sample period. The shift register output is connected to a plurality of parallel arranged signal analyzers 54,56,58,60 which comprise decoders which are preset to detect different formats and modulation levels. The signal analyzers are able to effect error correction on a bit by bit basis. Each of the signal analyzers 54 to 60 has an output coupled to the controller 26, which itself has an output 64 coupled to the signal analyzer. Each signal analyzer has means for determining whether data from the shift register is potentially decodable because it has a recognizable format. The controller 26 examines the outputs of the signal analyzers 54 to 60 and will inhibit that one of or those of the signal analyzers whose outputs indicate that no recognizable signal is being detected. Eventually the appropriate signal analyzer may provide an output indicating that it has successfully decoded the transmitted data and in consequence the controller 26 inhibits and renders inactive the other signal analyzers. A further signal analyzer 62 is provided and is permanently enabled in order to look for synchronization code words which as mentioned previously are always transmitted at 1200 b/s.

As an alternative to analyzing the stored data simultaneously in a plurality of parallel paths, it could be analyzed sequentially alternative by alternative in the controller. The advantages and disadvantages of these techniques effectively reduces to a trade-off between chip area versus current consumption. With present IC technology, the parallel analysis is preferred for current saving reasons.

Figure 7:
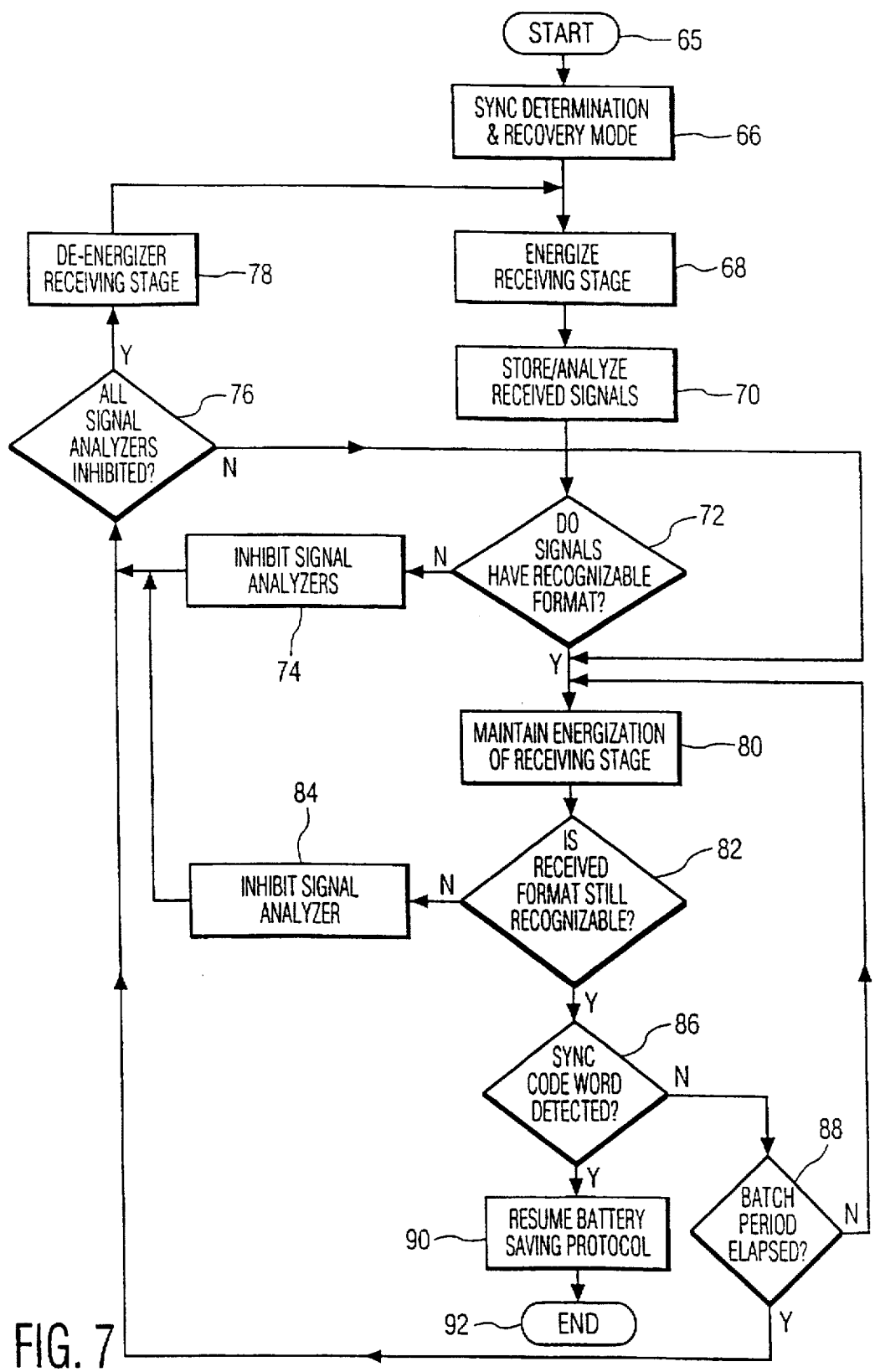
FIG. 7 is a flow chart illustrating the steps involved with the method of fade recovery in accordance with the present invention.

FIG. 7 is a simplified flow chart of the operations involved in fade recovery or transmission detection. The flow chart begins with a start block 65 which is coupled to a block 66 which determines that synchronization is lost and the fade recovery mode is to commence. Block 68 relates to the operation of energizing the receiving stage 20 (FIG. 7) for a time period equal to two sample periods. Block 70 relates to the operation of storing and analyzing any signals received. Block 72 relates to checking if the signals received have a recognizable format. If the answer is No (N), some or all of the signal analyzers are inhibited which is denoted by block 74. In block 76 a check is made to see if all the signal analyzers are inhibited. If the answer is Yes (Y), the receiving stage 20 is de-energized for a period equal to the duration of a predetermined period, for example one cycle, this is indicated by the block 78. The flow chart then reverts to the block 68.

If the answer from the block 72 is Yes (Y) and/or that from the block 76 is No (N), the flow chart proceeds to the block 80 which denotes maintaining the receiving stage energized for increments of one sample period. After each increment, those signal analyzers which have not been inhibited check, block 82, if the received format is still recognizable. That one, or those, of the signal analyzer(s) which answer No (N) are inhibited, block 84, and the flow chart proceeds to block 76. If the answer is Yes (Y), then a check is made in block 86 if a synchronization code word has been detected. If the answer is No (N), a check is made to see if a high rate batch period has elapsed, block 88. If the answer is No (N) the flow chart reverts to the block 80, but if the answer is Yes (Y), the flow chart proceeds to the block 76. If the answer from the block 86 is Yes (Y) then the block 90 indicates the pager resuming the normal battery saving protocol and leaving at least one of the signal analyzers uninhibited. The block 92 indicates termination of the fade recovery routine.

Although the present specification discloses one embodiment of the invention in detail, the various numerical values given are not intended to be limiting. The teachings of the present invention are not intended to be limited to a unidirectional message transmission and may, with suitable adaptations, be applied to, say, a cordless or cellular telephone system.

From reading the present disclosure, other modifications will be apparent to persons skilled in the art. Such modifications may involve other features which are already known in the design, manufacture and use of message transmission systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

What is claimed is:

1. A method of fade recovery in a digital message transmission system in which data is encoded into code words, formatted into frames of a batch and transmitted in accordance with one or more transmission formats, and a synchronization code word, indicative of the transmission format, is inserted at the beginning of each batch, the method of fade recovery comprising:

energizing a receiver for a first predetermined time period and storing any signals received during said first predetermined time period, analyzing said stored signals to determine if the stored signals being transmitted is in one of said transmission formats, and if so, maintaining energization of the receiver in predetermined time increments for up to a maximum of a second predetermined time period and checking if any of the stored signals associated with each such time increment conform to at least one of said transmission formats.

2. The method as claimed in claim 1 wherein said analyzing step is performed in a plurality of parallel operating paths, each path comprising signal recognition means for recognizing a respective one of the transmission formats, and inhibiting those of said operating paths in which there is no correspondence between the stored signals and the respective transmission formats and providing an output for that operating path or paths in which there is a recognizable correspondence with one or more of the transmission formats.

3. The method as claimed in claim 2, wherein the stored signals have error correction performed on them and in response to an unacceptable number of errors being detected in a particular operating path, that operating path is inhibited on the basis of no correspondence with the transmission formats.

9

4. The method as claimed in claim 3, wherein the first predetermined time period corresponds substantially to a duration of 2 sample periods, a sample period being equivalent to the maximum duration of an interleaved block of encoded data.

5. The method as claimed in claim 4, wherein the second predetermined time period corresponds substantially to a duration of a batch.

6. The method as claimed in claim 5, wherein a predetermined number of batches are concatenated into a cycle, and a third predetermined period corresponds to a duration of a cycle.

7. The method of claim 1, comprising the step of causing the receiver to assume its normal battery saving protocol in response to recognizing a synchronization code word.

8. The method of claim 1, comprising in response to not recognizing a synchronization code word, de-energizing the receiver and waiting for a third predetermined time period before repeating the sequence of operations.

9. The method of claim 1, wherein the first predetermined time period corresponds substantially to a duration of 2 sample periods, a sample period being equivalent to the maximum duration of an interleaved block of encoded data.

10. The method of claim 9, wherein each predetermined time increment corresponds substantially to a duration of one sample period.

11. The method as claimed in claim 1, wherein the second predetermined time period corresponds substantially to a duration of a batch.

12. The method as claimed in claim 1, wherein a predetermined number of batches are concatenated into a cycle, and a third predetermined time period corresponds to the duration of a cycle.

13. A digital message transmission system comprising means for encoding data into code words, means for formatting the code words into frames of a batch, means for inserting a synchronization code word at the beginning of each batch, said synchronization code word being selected to be indicative of one or more of the transmission formats of the code words in the said batch, means for transmitting the batches in accordance with the desired transmission formats, and receiving means having a receiver for receiving the transmissions and control means for controlling the operation of the receiving means, the control means including transmission detection means responsive to the loss of received signal, the transmission detection means comprising means for energizing the receiver for a first predetermined time period, means for storing any signals received during a first predetermined period, means for analyzing said stored signals, means responsive to the stored signals having a format which resembles one or more predetermined transmission formats for maintaining energization of the receiver in predetermined time increments up to a maximum of a second predetermined time period, said analyzing means checking the currently stored signals to determine whether any of the stored signals conform to at least one of said predetermined transmission formats.

14. The system as claimed in claim 13, wherein the transmission detection means comprises storage means for storing any signals which are received during the first predetermined time period, the signal analyzing means comprises a plurality of parallel operating paths, each path comprising signal recognition means for recognizing a respective one of a plurality of predetermined transmission formats, and means for inhibiting the or each of said operating paths in which there is no resemblance between the stored signals and the respective predetermined transmission format.

10

15. The system as claimed in claim 13, further comprising a selective call receiver, including a receiving means having a receiver for receiving the transmissions and control means for controlling the operation of the receiving means, the control means including transmission detection means responsive to the loss of received signal, the transmission detection means comprising means for energizing the receiver for a first predetermined time period, means for storing any signals received during the first predetermined period, means for analyzing said stored signals, means responsive to the stored signals having a format which resembles one or more predetermined transmission formats for maintaining energization of the receiver in predetermined time increments up to a maximum of a second predetermined time period, said analyzing means checking the currently stored signal sample to see if it conforms to one of said predetermined transmission formats.

16. The system as claimed in claim 15, wherein the transmission detection means comprises storage means for storing any signals which are received during the first predetermined time period, the signal analyzing means comprises a plurality of parallel operating paths, each path comprising signal recognition means for recognizing a respective one of a plurality of predetermined transmission formats, and means for inhibiting the or each of said operating paths in which there is no resemblance between the stored signals and the respective predetermined transmission format.

17. The method of claim 13, further comprising means responsive to recognizing a synchronization code word in the currently stored signal sample for causing the receiving means to assume its normal operation.

18. The method of claim 13, further comprising means, responsive to the transmission detection means not recognizing known transmitting formats in the analyzed signal, for de-energizing the receiver and waiting for a third predetermined time period before repeating the sequence of operations.

19. A selective call receiver for use in a digital message transmission system including means for encoding data into code words, means for formatting the code words into frames of a batch, means for inserting a synchronization code word at the beginning of each batch, said synchronization code word being selected to be indicative of a transmission format of the code words in the said batch, comprising receiving means having a receiver for receiving the transmissions and control means for controlling the operation of the receiving means, the control means including transmission detection means responsive to the loss of received signal, the transmission detection means comprising means for energizing the receiver for a first predetermined time period, means for storing any signals received during the first predetermined period, means for analyzing said stored signals, means responsive to the stored signals having a format which resembles one or more predetermined transmission formats for maintaining energization of the receiver in predetermined time increments up to a maximum of a second predetermined time period, said analyzing means checking the currently stored signal sample to see if it conforms to one of said predetermined transmission formats.

20. The selective call receiver of claim 19, wherein the transmission detection means comprises storage means for storing any signals which are received during the first predetermined time period, the signal analyzing means comprises a plurality of parallel operating paths, each path comprising signal recognition means for recognizing a respective one of a plurality of predetermined transmission formats, and means for inhibiting the or each of said operating paths in which there is no resemblance between the stored signals and the respective predetermined transmission format.

21. A method of fade recovery in a digital message transmission system in which data is encoded into code words and transmitted pursuant to one or more transmission formats, the method of fade recovery comprising:

energizing a receiver for and storing any signals received during a first time period;

determining whether said stored signals were transmitted in one of said transmission formats, and if so;

maintaining energization of the receiver in predetermined time increments for up to a maximum of a second time period; and during each time increment checking if any of the stored signals associated with each such time increment conforms to at least one of said transmission formats.

22. A digital message transmission system comprising;

means for encoding data into code words, formatting the code words into frames of a batch and for inserting a synchronization code word at the beginning of each batch, said synchronization code word being indicative of one or more of the transmission formats of the code words in said batch;

means for transmitting the batches in one of said transmission formats and a receiver for receiving said transmissions;

means for energizing the receiver for a first time period and means for storing any signals received during said first time period;

means for determining whether said stored signals were transmitted in one of said transmission formats;

means for maintaining energization of the receiver in predetermined time increments up to a maximum of a second time period; and means for checking the stored signals to determine whether any of the stored signals conform to at least one of said transmission formats.

23. A selective call receiver for use in a digital message transmission system including means for encoding data into code words, means for formatting the code words into frames of a batch, means for inserting a synchronization code word at the beginning of each batch, said synchronization code word being selected to be indicative of the transmission format of the code words in the batch, and means for transmitting said batches in one of said transmission formats, said receiver comprising:

means for receiving the transmissions;

means for energizing the receiver for a first time period and means for storing any signals received during the first time period;

means for determining whether said stored signals are in one of said transmission formats;

means for maintaining energization of the receiver in predetermined time increments up to a maximum of a second time period; and means for checking the currently stored signals to determine if it conforms to one of said transmission formats.

* * * * *